United States Patent

Tambara

[19]

[11] Patent Number: 6,112,032
[45] Date of Patent: Aug. 29, 2000

[54] MAGNETIC REPRODUCTION CIRCUIT FOR CAMERAS EQUIPPED WITH THE FUNCTION OF CORRECTLY REPRODUCING MAGNETIC INFORMATION EVEN UNDER THE PRESENCE OF NOISE

[75] Inventor: Yasuo Tambara, Hino, Japan

[73] Assignee: Olympus Optical Co., Ltd., Tokyo, Japan

[21] Appl. No.: 09/327,778

[22] Filed: Jun. 7, 1999

[30] Foreign Application Priority Data

Jun. 15, 1998 [JP] Japan ................................. 10-167115

[51] Int. Cl.⁷ .............................. G03B 17/24; G11B 5/00
[52] U.S. Cl. ................................ 396/319; 360/1; 360/25; 360/55
[58] Field of Search ..................................... 396/319, 210, 396/320; 360/1, 3, 55, 25

[56] References Cited

U.S. PATENT DOCUMENTS

| 5,727,240 | 3/1998 | Mizumoto et al. ................. 396/319 X |
| 5,839,008 | 11/1998 | Tanaka et al. ........................... 396/319 |
| 6,026,249 | 2/2000 | Sasaki et al. ....................... 396/319 X |

FOREIGN PATENT DOCUMENTS 9-269541  10/1997  Japan .

*Primary Examiner*—W. B. Perkey
*Attorney, Agent, or Firm*—Frishauf, Holtz, Goodman, Langer & Chick, P.C.

[57] ABSTRACT

A magnetic reproduction circuit for cameras has a magnetic head for detecting magnetic information on a film. In this reproduction circuit, an amplifying circuit amplifies an output signal of the magnetic head and a filter circuit detects an envelope of an output signal of the amplifying circuit. A detection time constant on a discharge side of the filter circuit is set to be smaller than a cycle of noise exerting an adverse effect on the amplifier circuit.

14 Claims, 5 Drawing Sheets

MAGNETIC REPRODUCTION CIRCUIT FOR CAMERAS EQUIPPED WITH THE FUNCTION OF CORRECTLY REPRODUCING MAGNETIC INFORMATION EVEN UNDER THE PRESENCE OF NOISE

BACKGROUND OF THE INVENTION

The present invention relates to a magnetic reproduction circuit for cameras.

Conventionally known are cameras having a magnetically recorded area in a film. In such cameras it is possible to, by the presence or absence of magnetism on a magnetic recording area, decide whether each frame in a film is exposed or not exposed and to select a head portion of an unexposed frame so that an exchange of films can be made in the middle of use (this function is referred to as an MRC (mid-roll change).

A signal read out of a magnetic recording area is very small and is liable to be affected by noise. For this reason, various noise control measures have heretofore been proposed. JPN PAT APPLN KOKAI PUBLICATION NO. 9-269541 discloses a method for suspending the operation of the camera when, in spite of eliminating noise, it still partially remains as it is.

Since such noise is not perceivable by the eye of the camera user, when the operation of the camera is suspended, it is not possible to locate its cause for trouble and sometimes to mistakenly take it as being caused by the trouble of the camera.

It is accordingly the object of the present invention to provide a magnetic reproduction circuit for cameras which can correctly reproduce magnetic information even in the presence of noise.

BRIEF SUMMARY OF THE INVENTION

In a first aspect of the present invention there is provided a magnetic reproduction circuit for cameras, comprising:

a magnetic head for detecting magnetic information on a film;

an amplifying circuit for amplifying an output signal of the magnetic head; and an envelope detection circuit for detecting an envelope of the output signal of the amplifying circuit and outputting an envelope signal, wherein a time constant on a discharge side of the envelope detection circuit is set to be smaller than a predetermined value.

In a second aspect of the present invention there is provided a magnetic reproduction circuit for cameras, comprising:

a magnetic head for detecting magnetic information on a film;

an amplifier circuit for amplifying an output signal of the magnetic head; and an envelope detection circuit for detecting an envelope of the output signal of the amplifying circuit, wherein a time constant on a discharge side of the envelope detection circuit is set to be below about 40 ms.

In a third aspect of the present invention there is provided a magnetic reproduction circuit for cameras, comprising a magnetic head for detecting magnetic data on a film;

an amplifier for amplifying an output signal of the magnetic head; and a detection circuit for detecting an envelope of the output of the amplifier, wherein a time constant on a discharge side of the detection circuit is set to be below about 40 ms.

In a fourth aspect of the present invention there is provided a magnetic reproduction circuit for cameras, comprising:

a magnetic head for detecting magnetic data on a film;

an amplifier for amplifying an output signal of the magnetic head;

a detection circuit for detecting an envelope of the output of the amplifier, an A/D conversion section for converting a detection output of the detection circuit to digital data;

a memory section for storing a maximum value or minimum value of digital data from the A/D conversion section while being updated; and a deciding section for deciding a presence or no presence of the magnetic data on the film by comparing the digital data from the A/D conversion section and the maximum value or minimum value stored in the memory section, wherein a time constant on the discharge side of the detection circuit is set to be below about 40 ms.

In a fifth aspect of the present invention there is provided a magnetic reproduction circuit for cameras, comprising:

a magnetic data detection circuit for converting magnetic information which is recorded on a film to an electric signal;

an envelope detection circuit for detecting an envelope of an output signal of the magnetic data circuit; and a deciding section for deciding a presence or no presence of the magnetic information recorded on the film by comparing a current value of the envelope signal at least detected by the envelope detection circuit with a previous maximum value of the envelope signal.

In a sixth aspect of the present invention, there is provided a magnetic reproduction circuit for cameras, comprising:

a magnetic head for detecting magnetic data on a film;

an amplifier for amplifying a magnetic head signal from the magnetic head; and an envelope detection circuit for detecting an envelope of an output of the amplifier, wherein a time constant on a discharge side is below about 40 ms.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

One embodiment of the present invention will be explained below with reference to the accompanying drawing.

Figure 1:
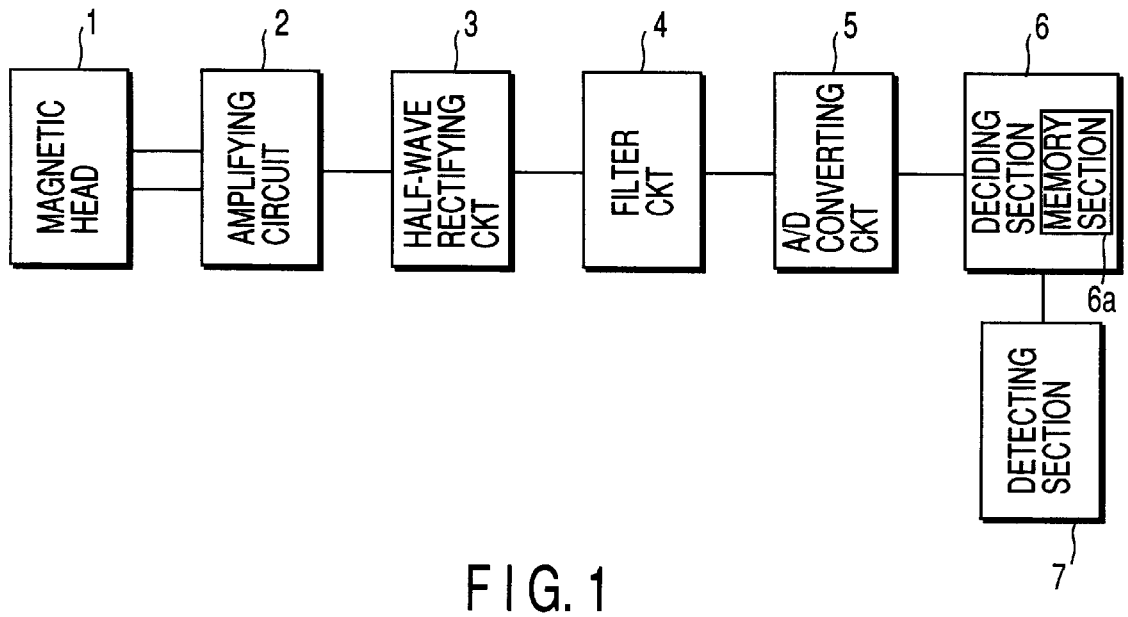
FIG. 1 shows an arrangement of a first embodiment of the present invention.

FIG. 1 is a block diagram showing an arrangement of one embodiment of the present invention.

The embodiment comprises a magnetic head 1 for detecting magnetic data recorded on a magnetic recording area on a film, an amplifier 2 for amplifying an output of the magnetic head 1, a half-wave rectifying circuit 3 for half-wave rectifying an output of the amplifier circuit 2, a filter circuit 4 serving as an envelope detecting circuit for finding an envelope of a half-wave rectified magnetic signal, an A/D converting circuit 5 for subjecting the envelope to an A/D conversion and a deciding section 6 for deciding the presence or absence of magnetic data on the basis of digital data from the A/D converting circuit 5. The deciding section 6 has a memory section 6a for storing digital data from the A/D converting circuit 5. Further, a detecting circuit 7 comprised of, for example, a photoreflector is connected to the deciding section 6 so as to detect perforations in the film and decide the presence of an area in which magnetic information is recorded.

Figure 2:
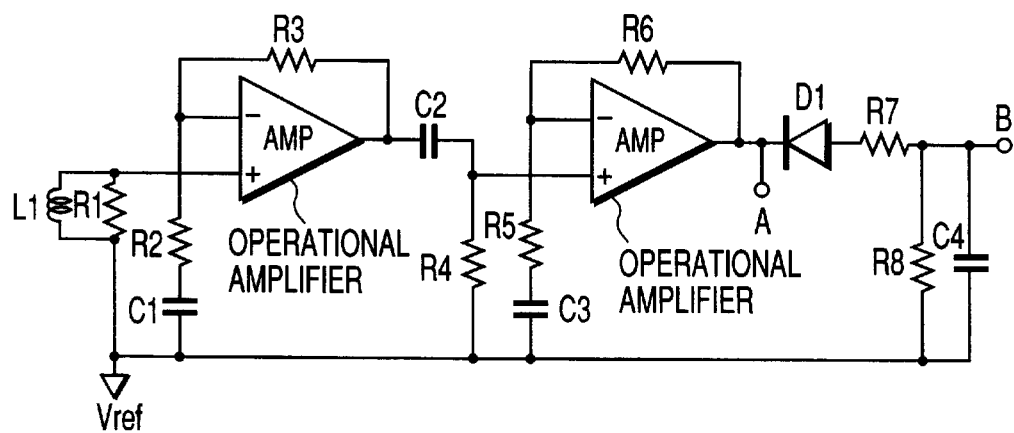
FIG. 2 is a practical circuit from a magnetic head to a filter circuit as shown in FIG. 1.

FIG. 2 is a practical form of a circuit from the magnetic head 1 to the filter circuit 4 as shown in FIG. 1. A very small current generated in a magnetic head L1 is converted by a resistor R1 to a voltage which is applied to a noninverting input of an operational amplifier 1. The operational amplifier 1, together with resistors R2 and R3, constitutes a noninverting amplifying circuit and the amplifying factor is represented by (R2+R3)/R2. Here, it is desirable that the amplification factor is over 400 times. A capacitor C1 and resistor R2 constitute a bypass filter having a double function of eliminating a low frequency noise and preventing an input offset of the operational amplifier 1 from being amplified.

An output of the operational amplifier 1 is sent to a noninverting input terminal of the operational amplifier 2 through a capacitor C2 and a resistor 4. The capacitor C2 and resistor R4 constitute a bypass filter and eliminate an offset caused by an input bias current of the operational amplifier 1. As in the case of the operational amplifier 1, the operational amplifier 2, together with resistors R5 and R6, constitutes a noninverting amplifying circuit. A capacitor C3 has the same function as that of the capacitor C1. An offset resulting from an input bias current of the operational amplifier 2 is eliminated by matching the resistors R4 and R6 to each other. The amplification factor of the operational amplifier 2 is set to over 400 times and a signal amplified to 160,000 times is obtained through the two-stage amplifying circuit structure.

The amplified signal is half-wave rectified by a diode D1 and input to a filter circuit comprised of resistors R7, R8 and capacitor C4. From this filter circuit only a signal lower than $V_{ref}$ is output. The capacitor C4 is used to form an envelope. The resistor R7 is provided to determine a time constant on the charging side and the resistor R8 is provided to determine a time constant on the discharge side. Generally, the greater the time constants on both the charging side and the discharging side, the stronger the resistance to noise. And a waveform is stable. According to the present embodiment, the time constant on the discharging side is set 40 ms for example, which is below a transmitting frequency of a hand-held telephone and, by doing so, a reproduction signal can be extracted from among noise and a decision is made on the presence or absence of magnetic recordings.

Figure 3A:
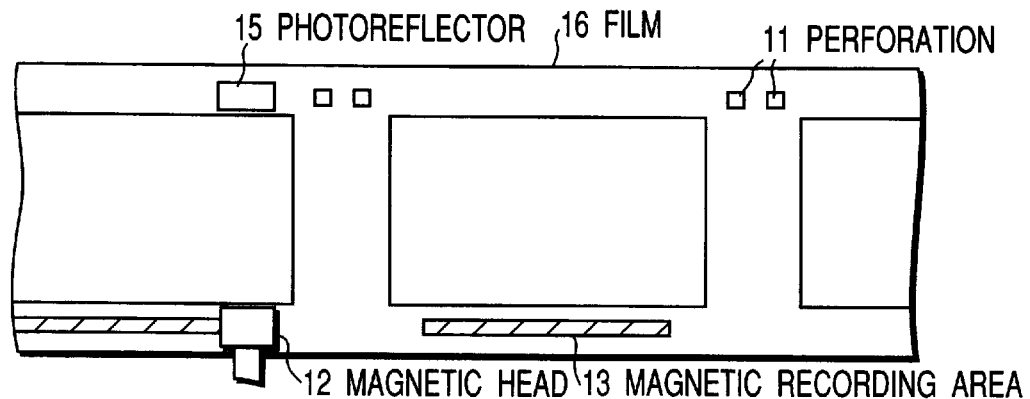
FIGS. 3A and 3B, each, are a view showing a positional relation among a film, a magnetic head and photoreflector.
Figure 3B:
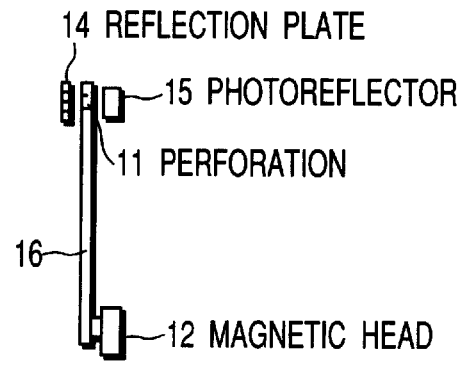

FIGS. 3A and 3B, each, are a view showing a positional relation among a film 16, magnetic head 12 and photoreflector 15. Here, the photoreflector 15 detects the pass of perforations in the film 16 and detects a magnetically recorded area 13 on the film 16 and a remaining area (a non-magnetically recorded area) on the film 16. For this reason, a reflection plate 14 is located opposite to the photoreflector 15 with the film 16 interposed and outputs a signal when the perforation in the film 16 passes.

Figure 4:
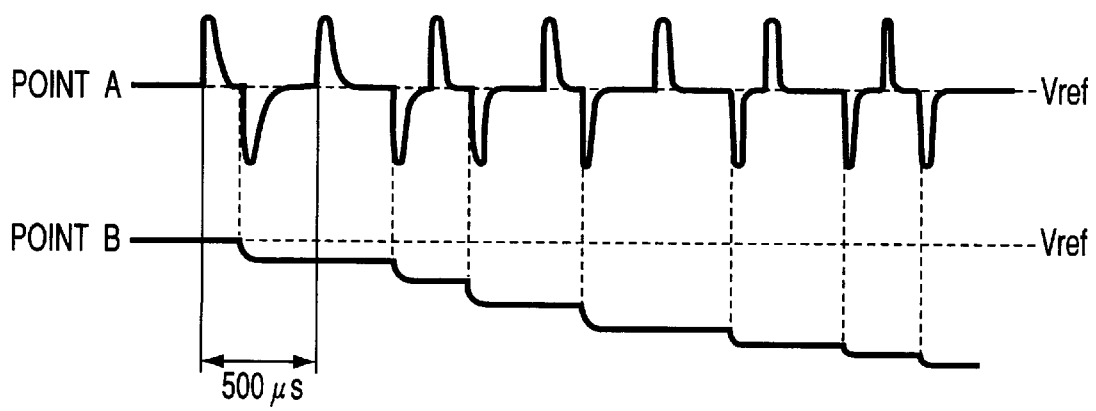
FIG. 4 is a view showing the waveforms of signals on two output points A and B in the circuit shown in FIG. 2.

FIG. 4 shows the waveform of signals appearing at two outputs A, B in the circuit shown in FIG. 2, noting that A represents an output point of the amplifying circuit 2 and B an output point of the filter circuit 4. At the output point A, a magnetic signal appears as a signal obtained by amplifying a pulse, as it is, generated in the magnetic head 1 (L1). This signal becomes a waveform signal of an up/down swing with the $V_{ref}$ as a reference. The period of the signal is, here, about 500 μs, though varying depending upon the density of the magnetic recording and feed speed of the film.

The waveform on the point B is obtained through the charging of the capacitor c4 via the resistor R7, for those pulses emerging below the $V_{ref}$ at the waveform on the point A, and through the discharge of the capacitor C4 via the resistor R8, for those pulses emerging above the $V_{ref}$. In order to change a magnetic signal on the magnetic head 1 (L1) to an envelope-like signal, the resistive value of the resistor R8 is so set as to have a time constant adequately great relative to the 500 μs set out above.

Figure 5:
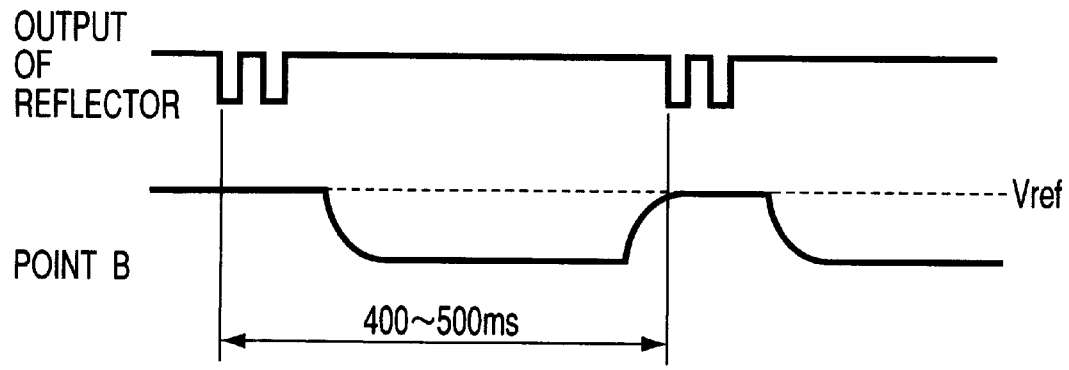
FIG. 5 is a view which shows a relation between an output of the photoreflector and the waveform of a signal on the point B.

FIG. 5 shows a relation between an output of the photoreflector 15 and the waveform of a signal on the point B. The feed speed of the film is 400 to 500 ms per frame of the film. As shown in FIGS. 3A and 3B, a plurality of perforations 11 are provided at the one end of the film 16, and a plurality of magnetic recording areas 13 are provided at the other end of the film 16. However, the other end of the film 16 has no magnetic recording areas at the portions corresponding to the perforations 11. In such portions a signal on the point B is $V_{ref}$, while, on the magnetic recording area-present edge, the magnitude of the signal becomes lower than the $V_{ref}$. On the other hand, in an unexposed frame, there occurs no such signal fall. Therefore, by detecting the fall of the signal it is possible to determine whether or not the film's frame is exposed.

Figure 6:
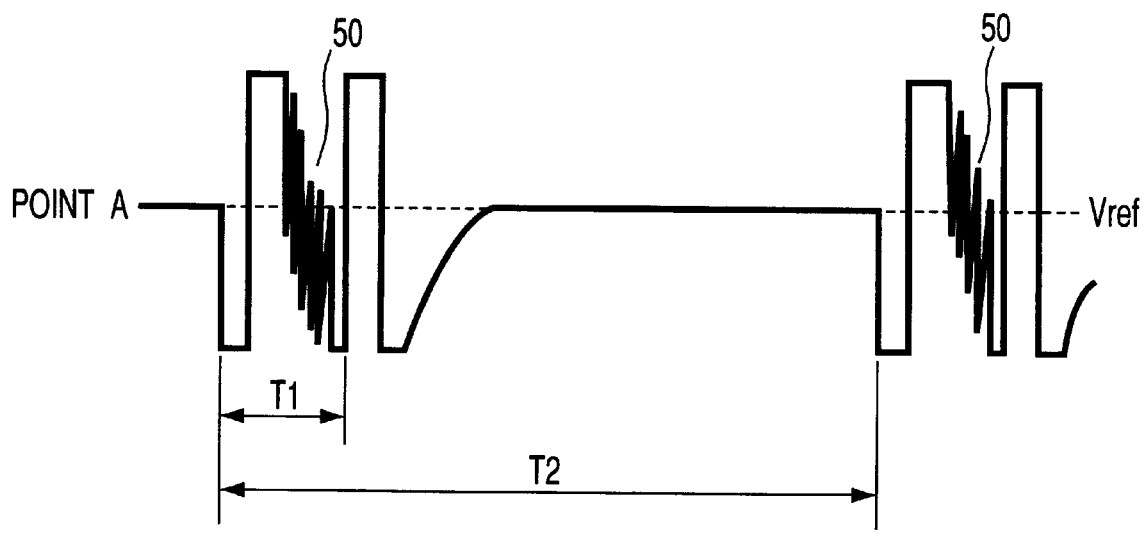
FIG. 6 is one example of a waveform of noise generated when a hand-held telephone is in a talking state.

FIG. 6 shows one example of the waveform of noise generated when a hand-held telephone set is in a talking state near a camera equipped with the circuit of FIG. 2. FIG. 6 shows a signal with the noise 50 superimposed thereon. In the hand-held telephone, signals are repeatedly transmitted/ received in a given period (T2) and a high-power electromagnetic wave is output at a transmitting time (T1). The T1/T2 ratio is ⅓ for a full rate system and ⅙ for a half-rate system. In general, the period T2 is 40 ms for a digital telephone of 800 MHz and 20 ms for a 1.5 GHz digital telephone.

Figure 7:
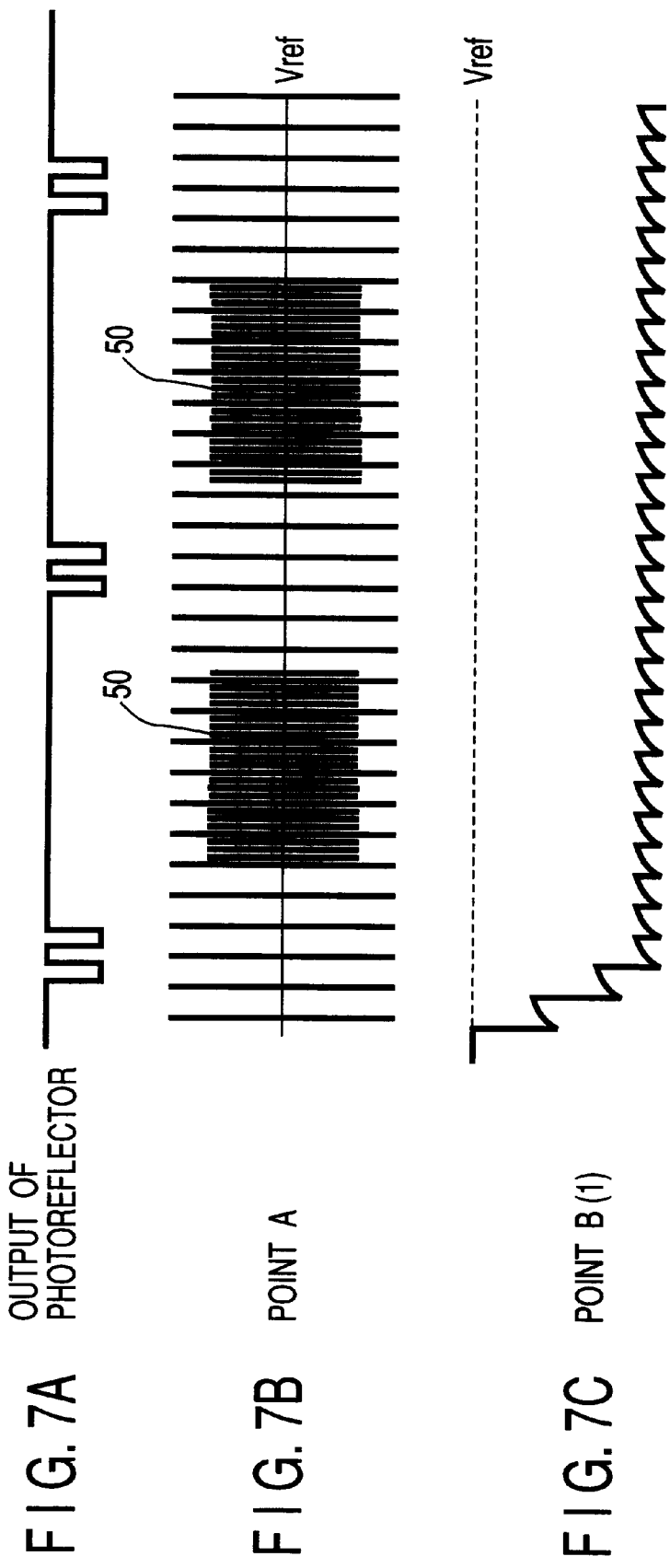
FIG. 7A shows the output of the photoreflector.
FIGS. 7B to 7D show the waveforms of signals on the points A and B with noise 50 of the hand-held telephone superimposed on a reproduced magnetic signal.

FIG. 7A shows an output of the photoreflector and FIGS. 7B to 7D show the waveforms of signals on the points A, B with the hand-held telephone's noise 50 superimposed on a reproduced electromagnetic signal. At the point A, both signals are amplified, as they are, as shown in FIG. 7B and can be identified by eye evaluation. However, the waveform on the point B emerging after an envelope detection is such that, as shown in FIG. 7C, a reproducing signal disappears due to too large a fall of a signal resulting from the noise 50 of the hand-held telephone. It is, therefore, difficult to determine the presence or no presence of the magnetic recordings. If, therefore, the time constant of the capacitor C4 and resistor R8 is set to be smaller than the noise period of the hand-held telephone, then a discharge curve at the intervals of the noise enables a decision to be made, as shown in FIG. 7D, between the area where a magnetic signal is present and the area where no magnetic signal is present.

Figure 8:
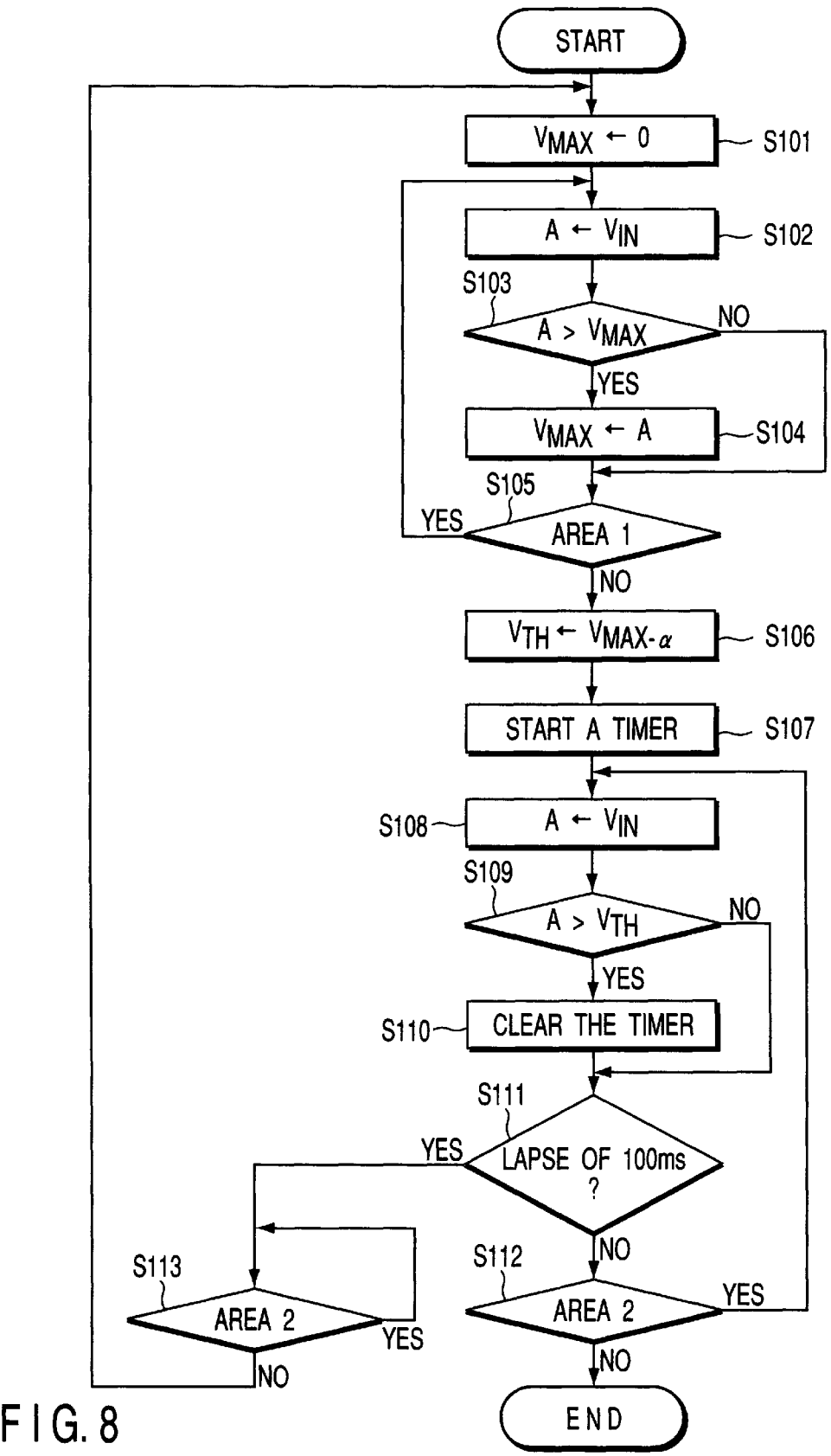
FIG. 8 is a flow chart for explaining the operation of a deciding section for deciding a presence or no presence of a magnetic recording area on the basis of the waveform of a signal on the point B(2) in FIG. 7D.

FIG. 8 is a flow chart for explaining the operation of the deciding section 6 for deciding the presence or absence of the magnetic recording area on the basis of the waveform of the signal on the point B(2). First, at step S101, a variable V MAX (area storing a maximal amplitude value) is set to 0. At step S102, an A/D value $V_{IN}$ of the waveform on the point B is read onto a resister A. At step S103, a comparison is made between the value of the register A and the V MAX value. If A>V MAX, then at step S104 the V MAX is rewritten as the value of the register A and, if otherwise, the V MAX remains as it is. At step S105, whether there is no magnetic recording area or otherwise is decided from the output signal of the photoreflector 15. If there is still no magnetic recording area (area 1), control at step S105 goes back to step S102 and again the A/D conversion is repeated. By repeating this loop, the greatest one of those signal waveforms on the point B(2) as shown in FIG. 7D is stored in the $V_{MAX}$.

When an entry out of the area 1 into the magnetic recording area is effected, the decision at step S105 is NO and control goes out of the loop and, at step S106, a threshold voltage $V_{TH}$ is formed as a reference decision level for deciding the presence or absence of a magnetism. Here, the $V_{TH}$ is obtained by subtracting a noise margin α from the earlier found V MAX. At step S107, a timer is started for counting the time at which the signal becomes lower than the $V_{TH}$. At step S108, an A/D value is read onto the register A and a comparison is made, at step S10, between the value of the register A and the $V_{TH}$. If A>$V_{TH}$, then at step S110, the timer is cleared to set the time counting to zero. And, if otherwise, the time counting continues.

At step S111, a decision is made as to whether or not the timer counts up to 100 ms. Unless 100 ms is reached, a decision is made, at step S112, to see whether or not there is any magnetic recording area (area 2) present. Here, if it is in the area 2, control again goes back to step S108 to effect A/D conversion. In the case where, at step S111, 100 ms is decided as having been passed, it is determined that magnetic data is present on the frame. At step S113 a wait is made for going out of the area 2 and control goes back to step S101 to allow a decision to be made for the next frame. In the case where step S112 goes out of the "area 2" without a lapse of 100 ms, there exists no magnetic data in the frame involved and the frame is decided as being unexposed one and, in order to take a shot from this unexposed frame, a shift is made to the next operation.

According to the present embodiment, charges on the capacitor C4 are released within a transmission cycle of an electromagnetic wave transmitted from the hand-held telephone and, by doing so, the level of a decision for the presence or no presence of magnetic data is set based on the maximum value of the amplitude of an envelope at the area at which no magnetic data is present. And a decision for the presence or no presence of magnetic data is made on the basis of whether or not, in the magnetic recording area, the time at which a level involved becomes lower than the decision level is longer than the transmission cycle. By doing so, it is possible to decide the presence or no presence of magnetic data from among those signals buried in the noise and hence to perform a correct MRC operation.

According to the present invention, a magnetic reproduction circuit for cameras is provided which can correctly reproduce magnetic information even in the presence of noise.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic reproduction circuit for cameras, comprising:

a magnetic head for detecting magnetic information on a film;

an amplifying circuit for amplifying an output signal of the magnetic head; and an envelope detection circuit for detecting an envelope of the output signal of the amplifying circuit and outputting an envelope signal, wherein a time constant on a discharge side of the envelope detection circuit is set to be smaller than a predetermined value.

2. A magnetic reproduction circuit according to claim 1, wherein the time constant on the discharge side of the envelope detection circuit is set to be smaller than about 40 ms.

3. A magnetic reproduction circuit for cameras, comprising:

a magnetic head for detecting magnetic information on a film;

an amplifier circuit for amplifying an output signal of the magnetic head; and an envelope detection circuit for detecting an envelope of the output signal of the amplifying circuit, wherein a time constant on a discharge side of the envelope detection circuit is set to be below about 40 ms.

4. A magnetic reproduction circuit according to claim 3, further comprising an A/D converting section for subjecting an envelope signal which is detected by the envelope detection circuit to A/D conversion and a deciding section for deciding a frame on which magnetic information is present and a frame on which magnetic information is not present, wherein the deciding section uses, out of the A/D converted envelope signal, an A/D conversion value of an envelope signal corresponding to a minimum value of the amplitude of the output signal of the amplifier circuit as a reference decision level.

5. A magnetic reproduction circuit for cameras, comprising a magnetic head for detecting magnetic data on a film;

an amplifier for amplifying an output signal of the magnetic head; and a detection circuit for detecting an envelope of the output of the amplifier, wherein a time constant on a discharge side of the detection circuit is set to be below about 40 ms.

6. A magnetic reproduction circuit according to claim 5, wherein the detection circuit is comprised of a half-wave rectifying circuit.

7. A magnetic reproduction circuit for cameras, comprising:

a magnetic head for detecting magnetic data on a film;

an amplifier for amplifying an output signal of the magnetic head;

a detection circuit for detecting an envelope of the output of the amplifier, an A/D conversion section for converting a detection output of the detection circuit to digital data;

a memory section for storing a maximum value or minimum value of digital data from the A/D conversion section while being updated; and a deciding section for deciding a presence or no presence of the magnetic data on the film by comparing the digital data from the A/D conversion section and the maximum value or minimum value stored in the memory section, wherein a time constant on the discharge side of the detection circuit is set to be below about 40 ms.

8. A magnetic reproduction circuit according to claim 7, wherein the detection circuit is comprised of a half-wave rectifying circuit.

9. A magnetic reproduction circuit for cameras, comprising:

a magnetic data detection circuit for converting magnetic information which is recorded on a film to an electric signal;

an envelope detection circuit for detecting an envelope of an output signal of the magnetic data circuit; and a deciding section for deciding a presence or no presence of the magnetic information recorded on the film by comparing a current value of the envelope signal at least detected by the envelope detection circuit with a previous maximum value of the envelope signal.

10. A magnetic reproduction circuit according to claim 9, the envelope detection circuit includes a rectifying circuit for half-wave rectifying an output signal of the data detection circuit, and a filter having a time constant on a discharge side set to below a predetermined value and detecting an envelope of an output signal of the rectifying circuit.

11. A magnetic reproduction circuit according to claim 10, wherein a time constant on a discharge side of the filter is below 40 ms.

12. A magnetic reproduction circuit according to claim 9, further comprising a frame position detection circuit for detecting a pass of a perforation in the film and detecting whether or not there is an area on which the magnetic information be recorded and wherein the deciding section for deciding a presence or no presence of the magnetic information recorded on the film, by comparing a current value of the detected envelope signal and a previous maximum value of the envelope signal.

13. A magnetic reproduction circuit for cameras, comprising:

a magnetic head for detecting magnetic data on a film;

an amplifier for amplifying a magnetic head signal from the magnetic head; and an envelope detection circuit for detecting an envelope of an output of the amplifier, wherein a time constant on a discharge side is below about 40 ms.

14. A magnetic reproduction circuit according to claim 13, further comprising:

an area deciding section for detecting a position of a film and, in response to a result of detection, deciding an area at which magnetic recording is not possible and an area at which magnetic recording is possible;

an A/D conversion section for subjecting an envelope signal which is detected by the area deciding section to a digital signal; and a signal deciding section for setting a minimum value of an A/D conversion value from the A/D conversion section to a decision reference, at the area at which magnetic recording is not possible, and deciding a presence or no presence of magnetic recording at the area at which magnetic recording is possible.

* * * * *